Dec. 12, 1939.   S. V. DILLON   2,182,797
GRIPPING AND COUPLING MEANS
Filed March 15, 1938      4 Sheets-Sheet 1
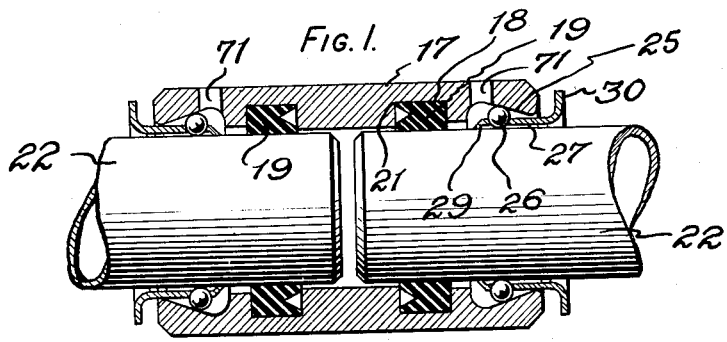
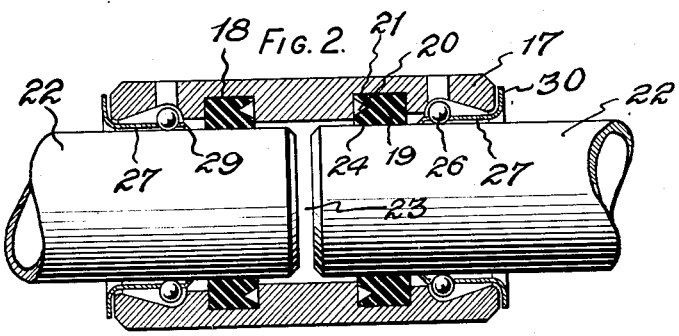
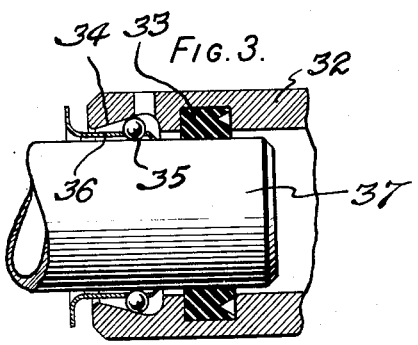
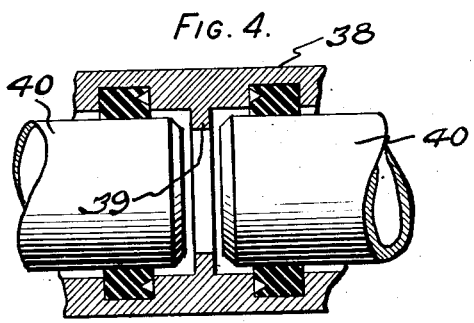
INVENTOR.
S. V. Dillon
BY Barry & Cyr
ATTORNEYS.

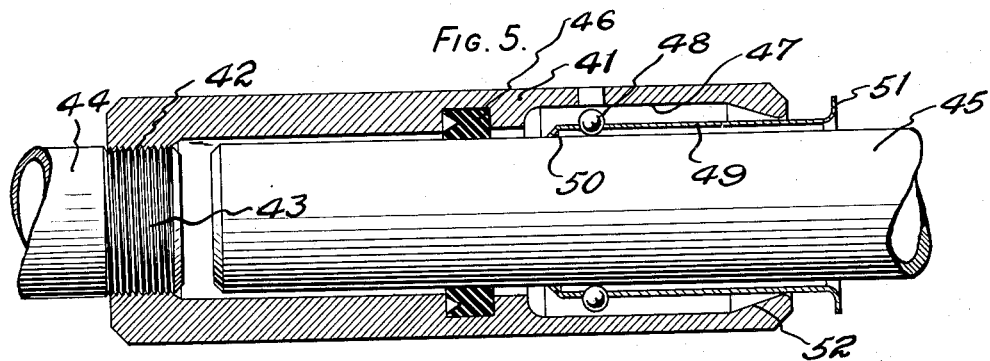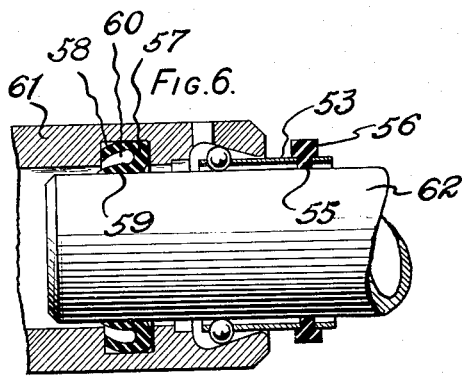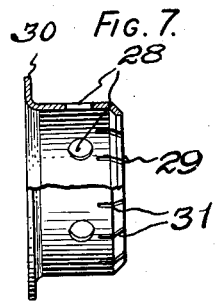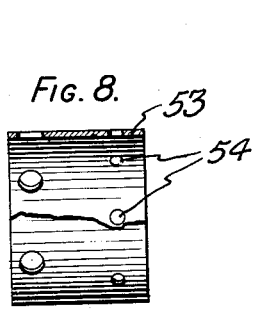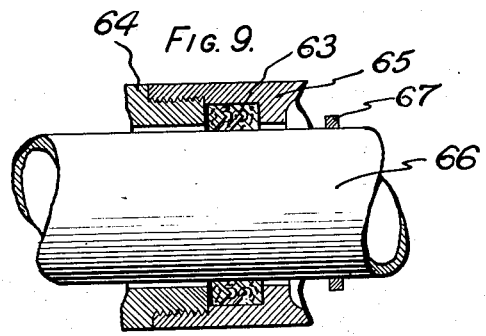

Dec. 12, 1939.   S. V. DILLON   2,182,797
GRIPPING AND COUPLING MEANS
Filed March 15, 1938   4 Sheets-Sheet 3
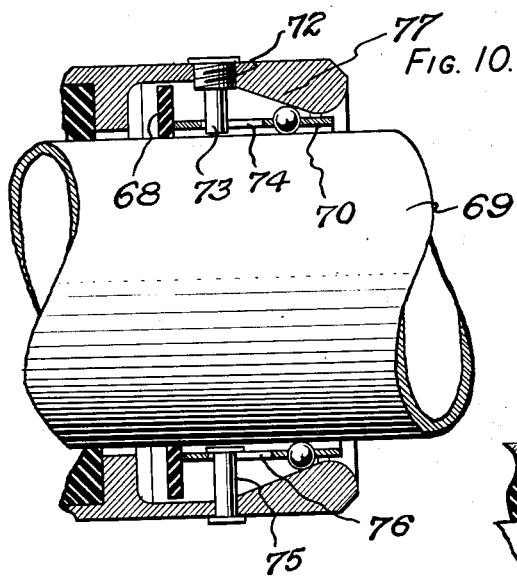
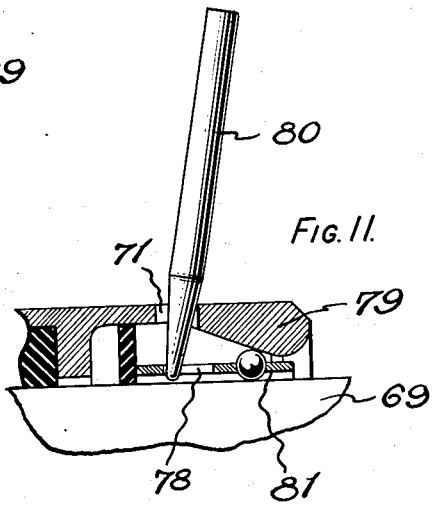
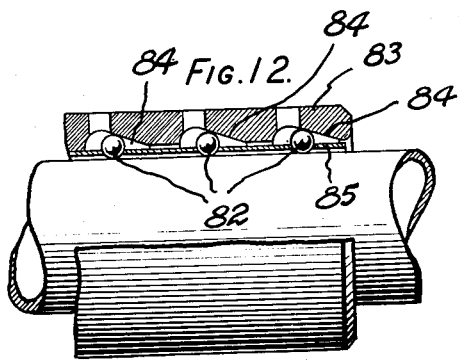
INVENTOR,
S. V. Dillon
BY Barry & Cyr
ATTORNEYS.

Dec. 12, 1939.　　　S. V. DILLON　　　2,182,797
GRIPPING AND COUPLING MEANS
Filed March 15, 1938　　　4 Sheets-Sheet 4
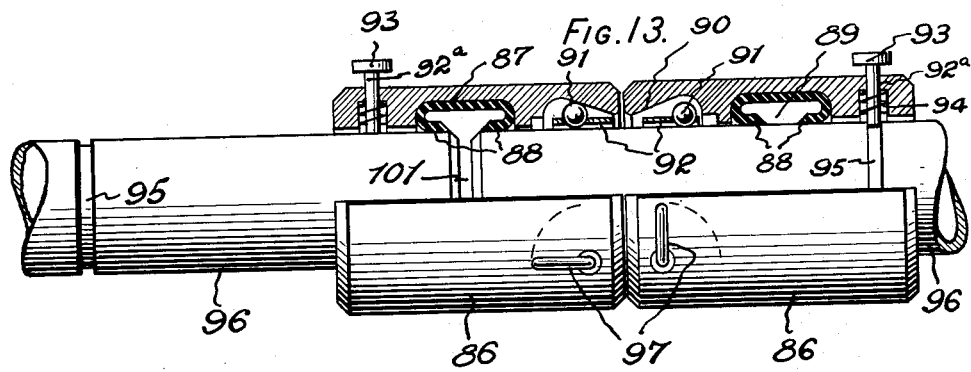
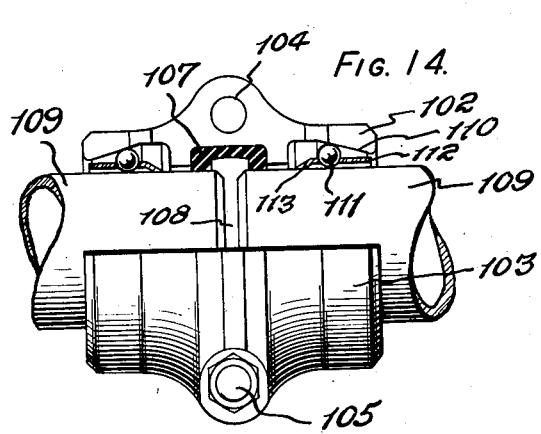
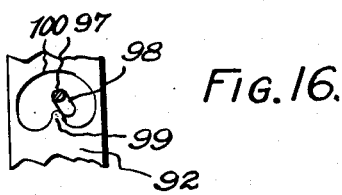
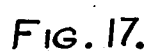
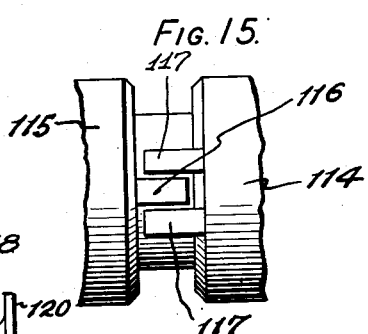
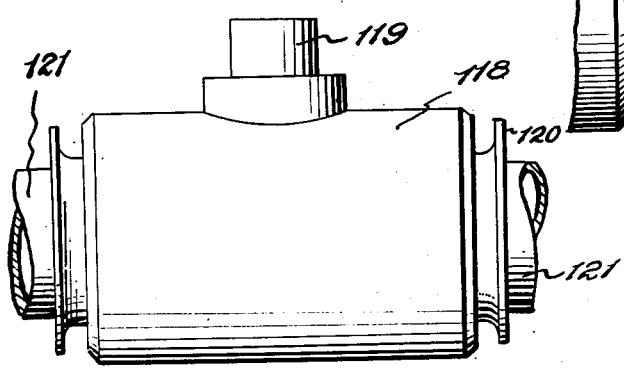
INVENTOR.
S. V. Dillon
BY Barry + Cyr
ATTORNEYS.

Patented Dec. 12, 1939

2,182,797

UNITED STATES PATENT OFFICE 2,182,797

GRIPPING AND COUPLING MEANS

Stephen V. Dillon, Tulsa, Okla.

Application March 15, 1938, Serial No. 196,076

8 Claims. (Cl. 285—193)

This invention relates to improvements in coupling or gripping means of the quick-detachable type.

The primary purpose of the invention is to provide improved simple practical means for gripping or coupling purposes.

Another object is to furnish coupling means for use in joining pipes, rods or the like, and which after assembly at the factory may be applied to the pipes or rods without the use of tools, bolts or the like.

Another object is to supply a pipe or rod joint adapted to permit expansion, contraction or deflection of the rods, pipes, etc.

A further object is to provide a coupling which will allow relatively great expansion of the degree required by so-called expansion joints.

A still further object is to furnish improved coupling means which may be incorporated in a pipe line or the like without the use of tools, and which will include a lock joint that will necessitate the removal of a particular joint before the couplings in the line may be removed.

Another object is to supply a quick-detachable coupling including a releasing part forming an element of the coupling.

Another purpose of the invention is to supply a coupling especially adapted for use with hose or the like, and which will permit the coupling of sections without necessity of twisting the hose; such a coupling is particularly advantageous in handling certain fluids, some of which are under relatively high superatmospheric pressures.

Another object is to provide a coupling especially adapted for use with fire hose or the like, and which will allow the sections of hose to be coupled or disconnected from one another without the use of any tool whatsoever.

A further object is to furnish gripping means particularly useful in connection with fishing tools for well purposes; the coupling being such that it will automatically engage a fish when a coupling is lowered and will automatically tightly grip the fish when the coupling is raised by the fishing string or the like.

With the foregoing objects outlined and with other objects in view which will appear as the description proceeds, the invention consists in the novel features hereinafter described in detail, illustrated in the accompanying drawings and more particularly pointed out in the appended claims.

In the drawings:

Fig. 1 is a diametrical longitudinal sectional view of one form of my improved coupling with the gripping means shown engaging or clamping sections of pipe.

Fig. 2 is a similar view with the gripping elements in released position.

Fig. 3 is a view similar to one half of Fig. 1, and illustrating means whereby a section of pipe may be connected to a larger section of pipe, a T, Y, L, valves, fittings or the like.

Fig. 4 is a longitudinal sectional view of a lock joint which may be employed with my improved couplings in a pipe line to lock sections of the line and make it necessary to remove the sections and joints in a particular order.

Fig. 5 is a view similar to Fig. 1 showing a single gripping assembly instead of a pair of such assemblies and with the housing or casing of the coupling made relatively long so that this form of coupling may take the place of a conventional so-called expansion joint.

Fig. 6 is a diametrical longitudinal sectional view of another embodiment of the invention showing a different type of packing ring and a different form of friction means for engaging the periphery of a rod, pipe or the like.

Fig. 7 is a side elevation partly in diametrical section of the releasing cage illustrated in Figs. 1, 2 and 3.

Fig. 8 is a similar view of the cage forming part of the structure shown in Fig. 6.

Fig. 9 is a diametrical sectional view of a modification in which the packing ring is of relatively stiff material, for example asbestos, held in place by a packing gland, the pipe in this form of the invention having a fixed peripheral ring adapted to actuate the gripping element cage for forcing the gripping elements into clamping engagement with the pipe.

Fig. 10 is a diametrical sectional view of an embodiment of the invention showing another cage-actuating means comprising a friction ring arranged on the pipe or the like.

Fig. 11 is a fragmentary view of a portion of the structure shown in Fig. 10 and illustrating the manner in which the gripping element cage may be actuated in order to release the gripping elements where it is desired to prevent release of the cage except by the use of a special key or the like.

Fig. 12 is a side elevation partly in diametrical section of a further modification in which more than one set of gripping elements are used in the gripping unit, for greater strength.

Fig. 13 is a side elevation partly in diametrical section of another embodiment especially adapted for use with train hose and the like.

Fig. 14 is a view similar to Fig. 13 of a coupling of the longitudinally split housing type, and showing a form of my invention incorporated therein.

Fig. 15 is a fragmentary elevation of portions of my improved coupling showing means to prevent relative rotation of parts of the coupling.

Fig. 16 is a fragmentary sectional view partly in elevation of a detail of the cage-releasing means shown in Fig. 13.

Fig. 17 is an elevation of a coupling embodying my invention and which may be used to connect a branch pipe or tube to a pipe line or the like.

Referring to the drawings, in the embodiment illustrated in Figs. 1 and 2, 17 is a tubular cage or housing provided internally with one or more grooves 18 to receive packing rings 19 of some suitable resilient material, such as rubber or the like. Each of these rings may be of the type shown in my patent, No. 1,789,379, dated January 20, 1929, and may be provided, the same as in that patent, with an annular groove or recess 20, in one end thereof adapted to receive fluid passing through the coupling under pressure to cause the lips at opposite sides of the groove to expand, the outer lips 21 being thus forced into tight engagement with the housing for sealing purposes.

The rod-like pipe or tube sections 22 are introduced into the housing from opposite ends thereof, and the ends of the pipes are left spaced apart as shown at 23, to permit expansion of the pipe sections and to allow fluid travelling through the pipe line to enter the grooves 20 to cause the lips 21 to move outwardly and the lips 24 to move inwardly, whereby the latter will tightly embrace the pipes.

In accordance with my present invention, each end portion of the housing is provided with a tapered bore or frusto-conical seat 25 adapted to cooperate with gripping elements 26 and to wedge such elements into tight gripping engagement with the pipes when the latter move outwardly away from one another. While these gripping elements may be of any suitable form, I prefer to make them of spherical shape, or in the form of balls, so that they may readily roll in action. Obviously these walls may be made of any suitable material depending on the purpose for which the coupling is to be used. They may be made of glass, porcelain, or any suitable metal, such as hard steel, bronze, etc.

The gripping elements preferably extend through cages 27 which surround the pipes, and each cage, as best shown in Fig. 7, may be in the form of a sleeve having ports 28 for the balls, an inwardly extending flange 29 at one end to frictionally engage the surface of one of the pipes, and an outwardly extending flange 30 at the other end adapted to be manipulated by the operator for moving the cage inwardly toward the housing in releasing the gripping elements from the pipe. In order that the flange end 29 may have a spring effect, I prefer to slit the cage at this end as indicated at 31.

In using this form of the invention, the coupling will preferably be sold with the parts in assembled relation, and if a pair of pipes are introduced into the housing, they will engage the packing means 19, the balls 26 and the flange 29, then as the flange frictionally grips the peripheries of the pipes, it will be understood that if the pipes are pulled away from one another, the cages 27 will move outwardly in opposite directions with the result that the balls will, due to contact with the tapered seats 25, be wedged into tight engagement with the pipes, so that the latter can be moved apart only a predetermined degree.

When it is desired to remove the coupling from the pipes, the operator simply presses inwardly on the flanges 30, and this causes the ball 26 to be moved away from the tapered seats 25 so that the pipe may be withdrawn from the coupling without interference by the balls.

In the embodiment of the invention illustrated in Fig. 3, the part 32 may be an end of a T, L or Y member or a portion of a valve or an end of a hose connector or reducer or other fitting, and the member 32 in this instant will be provided with packing means, such as a ring 33, and will also have an internal tapered seat 34 designed to cooperate with friction elements 35 which cooperate with a cage 36 and function to grip a pipe, tube 37 or the like. In this form of the invention, the parts 35 and 36 may be similar to the parts 26 and 27 shown in Figs. 1, 2 and 7.

Where it is desirable or necessary to have a locked line and prevent the line from being tapped by the removal of one of the couplings along the length thereof except at the ends, the housing 38 of the coupling, as shown in Fig. 4, may be provided internally with any suitable means, such as a flange 39, adapted to form an abutment between the end portions 40 of the two pipes. With this construction, it will be obvious that the flange in abutting against the extremity of either pipe will prevent the housing from being moved along either pipe to an extent where the coupling might be removed from the line. In other words, assuming that the structure shown in Figs. 1 and 2 is provided with an intermediate internal flange, such as shown at 39 in Fig. 4, if the cages 27 are pressed inwardly to release the balls, the housing cannot be moved along either pipe to an extent sufficient to allow removal of either pipe. Consequently, if a pipe line is laid having such coupling, the line can only be broken at the ends thereof which might be provided with couplings of the type shown in Figs. 1 and 2.

In Fig. 5, the invention is shown incorporated in an expansion type coupling, and in this modification, a tubular housing 41 may be provided at one end with internal threads 42 to engage the external threads 43 of a pipe 44. The other pipe 45 is inserted from the opposite end of the housing and it is embraced by the packing ring 46. As relatively great expansion is required in this type of joint, the bore of the housing is provided with an elongated cylindrical surface 47 to accommodate movement of the balls 48 lengthwise of the coupling. Here also the cage 49 is elongated and may be provided at one end with a flange 50 to frictionally engage the pipe, and at its opposite end with an external flange 51 used by the operator in manipulating the cage. The cylindrical surface merges into a tapered or frusto-conical seat 52, which cooperates with the balls to wedge them against the pipe when the pipe 45 is pulled in a direction away from the pipe 44.

Instead of forming the cage with a friction flange, such as 29 or 50, the cage may be frictionally engaged with the pipe by any other suitable means. For example, as shown in Figs. 6 and 7, the cage 53 may have a number of holes 54 to accommodate fingers 55 formed of any suitable resilient material and project inwardly from a collar 56 which may be of the same material.

As shown in Fig. 6, the packing rings need not necessarily be of the shapes shown in Figs. 1 to 5 inclusive, but may consist of a resilient or elastic ring 57, which is of C shape in radial section. The lips 58 and 59 provided by this configuration are relatively wide and when the fluid passing through the pipe line under pressure, enters the groove 60 of such packing ring, obviously the lips will be forced into tight engagement with the housing 61 and the peripheral surface of the pipe 62.

In Fig. 9, I have shown the packing ring 63 as made of relatively non-resilient material, such as asbestos, clamped in place by a gland 64 having threaded engagement with the housing 65. Obviously the ring 63 might be made of any suitable heat-resisting material instead of asbestos.

In Fig. 9, I have also shown the pipe 66 as provided with a fixed external ring 67, which can abut against the inner end of a cage, such as shown at 53 in Fig. 6, for the purpose of wedging the balls into engagement with the pipe. This embodiment of the invention will permit the use of a much shorter cage than is shown in Fig. 6, and as a matter of fact, the cage in such a construction need not extend to the exterior of the housing.

In the form of the invention illustrated in Figs. 10 and 11, the friction means, which actuates the cage in one direction, may be a resilient ring 68, which embraces the pipe 69 and fixes itself to the pipe due to the resiliency of the material from which the ring is formed. Here, as explained in connection with Fig. 9, the ring is adapted to engage the inner end of the cage 70, and the cage in such examples, as shown in Figs. 6, 8 and 10, may be a simple cylindrical sleeve, and as it has no external flange, such as 30 (Fig. 7) or 51 (Fig. 5), there is no liability of external objects causing accidental release of the balls. As the ring 68 is made of rubber or the like, it is manifest that it eliminates the possibility of corrosion or erosion interfering with the actuation of the cage by the pipe.

In Figs. 1, 2, 3, 5, 6 and 11, the housing is provided with apertures 71 to permit the balls to be introduced into the holes of the cage, and after a complete set of balls has been introduced, the cage is turned so that no one of the balls registers with the hole. Then the cage is fastened in place to prevent relative rotation by the cage and housing. For instance, as shown in Fig. 10, the hole might be closed by any suitable means, such as a threaded plug 72, screwed into the casing and having an internal extension 73 engaging a slot 74, lengthwise of the cage to prevent rotation of the latter. Instead of providing the plug with an extension, the hole may simply be plugged and the cage can be locked against rotation by one or more rivets 75 which joins the cage and housing and extends through a longitudinal slot 76 in the cage. Either or both of the slots 74, 76, in such a construction, will, of course, permit movement of the cage axially of the pipe to cause the balls to wedge against the tapered seat 77 of the housing.

Of course, after the balls have been assembled in the cage, and the hole is plugged, they will prevent the cage from pulling out of the housing even in the absence of the extension 73 or the rivet 75.

For the purpose of releasing a cage of the type illustrated in Fig. 10, the cage may be provided with an aperture 78 that may be aligned with a hole 71 in the housing 79 so that a pin or other suitable tool 80 may be introduced and used as a lever to force the cage 81 inwardly toward the medial portion of the housing.

In cases where a single set of balls is insufficient to provide the requisite gripping, I may use a plurality of sets of balls as indicated at 82 in Fig. 12. In this assembly, the housing 83 will have the required number of tapered seats 84 to accommodate the sets of balls, and the cage 85 will have the required number of apertures to receive the balls. The cage in this instance may have additional features, such as shown in Figs. 1, 5, 6, 10 and 11, so that the cage will be actuated in one direction by movement of a pipe outwardly away from the housing and may be moved in the opposite direction by any suitable means.

The embodiment of the invention illustrated in Fig. 13 is adapted especially as a coupling for train hose or the lie. In this embodiment, I prefer to employ a pair of tubular housings 86, each provided at its medial portion with an internal pressure packing ring 87 which is of substantial inverted U shape in radial section and forms internal lips 88 that project toward one another and are positioned at opposite sides of an internal cavity 89. One end of each housing, in this construction, forms an internal tapered seat 90 which cooperates with a set of balls 91 mounted in a cage 92. The opposite end portion of each housing has a radially extending slidable pin 92a provided with a handle 93 at its outer end. The pin is urged inwardly by a coil spring 94 which surrounds the same, and the pin is adapted to engage an external annular groove 95 provided in the periphery of a nozzle or nipple 96 extending from a section of the hose to be coupled.

For the purpose of releasing the balls, each housing may be provided with a hand-operated rotatable member 97 having an arm 98 (Fig. 16) coacting with a lug 99 forming part of the cage 92 and extending into an aperture 100 cut in the wall of the cage. It is evident that when the member 97 is turned in either direction, the arm 98 engages the lug 99 and thus acts to move the cage with its balls toward or away from the tapered seat.

In attaching this type of coupling, one of the housings 86 and the members which it carries may be placed on one of the nipples 96 until the latch 92a engages the groove 95 of the nipple. Then the other housing with its parts may be placed on the other nipple 96 and moved on that nipple until its latch engages the groove 95 of the last-mentioned nipple. Then when the two nipples are placed in axial alignment, the second housing may be slid along the nipples into engagement with the first housing, and this will bring the packing ring of the second housing into a position where it will bridge the gap 101 between the adjacent ends of the two nipples. Of course, pressure fluid passing through the line will enter the cavity 87 of the packing ring which bridges the space 101 with the result that the lips of the last-mentioned packing ring will be caused to tightly embrace the external surfaces of the two nipples and form a tight seal.

In Fig. 14 I have shown the invention in a coupling of the split housing type. In this embodiment the sections 102 and 103 are provided with apertured ears 104 which receive bolts 105 that hold the sections together. The packing ring 106 in this instance bridges the gap 108 between the adjacent ends of the pipes 109, and the ends of the housing have internal tapered seats 110 cooperating with balls 111 mounted in cages 112 having flanges 113 to frictionally engage the outer surfaces of the pipes.

In any form of the invention where it is desirable to prevent relative rotation of the parts after the joint is made, relatively movable members 114 and 115 (Fig. 15) may be provided respectively with fixed fingers 116, 117, which abut against one another if an attempt is made to turn one part relatively to the other. In Fig. 15, I have shown only two fingers, but it is obvious that any number of these fingers may be used on each of the relatively rotatable parts to limit turning movement of the parts.

By way of example we will assume that the part 115 corresponds with the housing shown in Fig. 10 and the part 114 with the pipe 69 of this figure. If such a joint is used as a hose coupling and is provided with fingers such as shown in Fig. 15, such fingers will prevent rotation of the members due to whipping of the hose.

In the structure shown in Fig. 17, the housing 118 may be of the type shown in any of the other figures but is provided with a nipple 119 that projects at an angle to the axis of the housing so that a branch pipe may be connected to the housing in this instance by any suitable joint. The housing will contain packing means, one or more tapered seats, one or more sets of balls as well as cages 120, which surround the pipe sections 121 of the line. Due to this construction, it is obvious that the housing 118 can be rotated about the axis of the pipes 121 to bring the nipple 119 in any position where it may be readily attached to the branch line.

While I have illustrated and specifically described the use of my invention for coupling of pipes, tubes, hose or the like, it is manifest that I may employ the invention for connecting other rod-like elements or may use the same for fishing tool purposes or for capping wells or the like.

Many modifications of the invention will be apparent to those skilled in the art without departing therefrom or from the scope of the claims, and since the foregoing disclosure has been given by way of examples for clearness and understanding, no unnecessary limitations should be understood and the appended claims should be construed as broadly as the state of the art permits.

What I claim and desire to secure by Letters Patent is:

1. A structure of the character described, comprising a housing member having internal tapered seat means, a cage, gripping elements carried by the cage and movable relatively to said tapered seat means, a rod-like member extending through the cage into the housing, and means associated with the cage and frictionally engaging the exterior of the rod-like member and actuated by the latter for causing the cage to move with the rod-like member whereby the gripping elements are forced by said tapered means into wedging engagement with the rod-like member when said member is moved in a direction away from the housing.

2. A structure of the character described, comprising a housing member having internal tapered seat means, a cage having apertures, rolling elements extending through said apertures and movable with the cage relatively to said tapered seat means, a rod-like member extending through the cage into the housing, and means associated with the cage and frictionally engaging the exterior of the rod-like member and actuated by the latter for causing the cage to move with the rod-like member whereby the gripping elements are forced by said tapered means into wedging engagement with the rod-like member when that member is moved in a direction away from the housing member.

3. A structure of the character described, comprising a housing member having internal tapered seat means, a cage, gripping elements carried by the cage and movable relatively to said tapered seat means, a tube extending through the cage into the housing, a packing ring positioned in the housing inwardly of the cage and forming a seal between the tube and the housing, and means associated with the cage and frictionally engaging the exterior of the tube and actuated by the latter for causing the cage to move with the tube whereby the gripping elements are forced by said tapered means into wedging engagement with the tube when the latter is moved in a direction away from the housing members.

4. A structure of the character described, comprising a tubular housing member having oppositely tapered seats spaced from one another, a cage associated with each seat, gripping elements carried by each cage and movable relatively to its associated tapered seat, tubes extending through said cages into the housing, and means associated with each cage and frictionally engaging the exterior of one of the tubes and actuated by the latter for causing such cage to move with said tube whereby the gripping elements of that cage are forced by its associated tapered seat into wedging engagement with the tube when said tube is moved in a direction away from the housing.

5. A structure of the character described, comprising a tubular housing member having oppositely tapered seats spaced from one another, a cage associated with each seat, gripping elements carried by each cage and movable relatively to its associated tapered seat, tubes extending through said cages into the housing, means associated with each cage and frictionally engaging the exterior of one of the tubes and actuated by the latter for causing such cage to move with said tube whereby the gripping elements are forced by the tapered seats into wedging engagement with the tubes when said tubes are moved in opposite directions away from the housing, and packing means in the housing arranged between the cages for sealing the joints between the housing and the exterior of the tubes.

6. A structure of the character described, comprising a housing member having internal tapered seat means, a cage, gripping elements carried by the cage and movable relatively to said tapered seat means, a rod-like member extending through the cage into the housing, and means associated with the cage and frictionally engaging the exterior of the rod-like member and actuated by the latter for causing the cage to move with the rod-like member when said member is moved in a direction away from the housing, said cage having a part arranged exteriorly of the housing to permit manipulation of the cage.

7. A coupling of the character described, comprising a housing having an annular portion provided with an internal tapered seat, an annular cage having a portion positioned within the seat, rolling gripping elements carried by the cage and movable relatively to said seat, a tube extending through the cage into the housing and having a plain cylindrical external surface engaged by said gripping elements, annular packing means surrounding the tube and sealing the joint between the tube and housing, and means associated with the cage and frictionally engaging the exterior of the tube and actuated by the latter for causing the cage to move with the tube whereby the gripping elements are forced by said tapered seat into wedging engagement with the tube when the latter is moved in a direction away from the housing.

8. A structure of the character described, comprising a tubular housing having oppositely tapered seats spaced from one another, cages, a set of rolling gripping elements carried by each cage and movable thereby relatively to one of said seats, tubes extending through said cages into the housing, packing means positioned in the housing inwardly of the cages and forming seals between the inner end portions of the tubes and the housing, and means associated with the cages and frictionally engaging the exterior of the tubes and actuated by the latter for causing the cages to move with the tubes whereby the gripping elements are forced by said tapered seats into wedging engagement with the tubes when the latter are pulled axially in directions away from the housing.

STEPHEN V. DILLON.